Nov. 30, 1965  J. D. LINCOLN  3,220,906
METHOD AND APPARATUS FOR MAKING PITCH IMPREGNATED HONEYCOMB
Filed Sept. 30, 1959  5 Sheets-Sheet 1

FIG. 1

INVENTOR
JOHN D. LINCOLN
BY Mason, Porter, Diller & Stewart
ATTORNEYS

Nov. 30, 1965   J. D. LINCOLN   3,220,906
METHOD AND APPARATUS FOR MAKING PITCH IMPREGNATED HONEYCOMB
Filed Sept. 30, 1959   5 Sheets-Sheet 3

INVENTOR
JOHN D. LINCOLN
BY
ATTORNEYS

Nov. 30, 1965     J. D. LINCOLN     3,220,906
METHOD AND APPARATUS FOR MAKING PITCH IMPREGNATED HONEYCOMB
Filed Sept. 30, 1959

INVENTOR
JOHN D. LINCOLN

United States Patent Office 3,220,906
Patented Nov. 30, 1965

3,220,906
METHOD AND APPARATUS FOR MAKING PITCH
IMPREGNATED HONEYCOMB
John D. Lincoln, Mount Vernon, Ohio, assignor to Continental Can Company, Inc., New York, N.Y., a corporation of New York
Filed Sept. 30, 1959, Ser. No. 843,485
6 Claims. (Cl. 156—197)

The invention relates in general to new and useful improvements in the manufacture of honeycomb, and more particularly relates to a novel method and apparatus for the manufacture of pitch impregnated honeycomb.

In accordance with the invention, it is proposed to provide two webs in roll form and to continuously feed and adhere together the two webs to form a two-ply web which is cut into sheets of predetermined length, which sheets are stacked and bonded together to form a honeycomb block. The honeycomb block is then suitably sliced into a plurality of slices of the desired thickness. The honeycomb slices are then secured together in end-to-end relation and are expanded to form a continuous honeycomb web. The honeycomb web is then passed through a pitch bath wherein the material of the honeycomb web is impregnated with pitch to both reinforce and waterproof the honeycomb web.

It is also proposed in accordance with the invention to make use of the pitch impregnated honeycomb web by cutting the honeycomb web into a plurality of blocks or sections. The individual blocks are then coated with adhesive and are applied to the underside of a support forming panel of a pallet to form feet for the pallet. It is proposed that the block be formed and applied in a continuous operation.

In view of the foregoing, it is an object of the invention to provide a novel apparatus for continuously adhesively securing together two webs supplied in roll form, after which the webs are repeatedly cut into individual sheets of identical length and the sheets fed and stacked one upon the other with the sheets of the stack being adhesively secured to each other so as to form a honeycomb block which may be sliced to form a plurality of honey comb slices of the desired thickness.

Another object of the invention is to provide an apparatus for forming a honeycomb block from two continuous webs, the apparatus including a glue applicator for applying glue in node lines to opposite sides of one of the webs whereby the webs may be combined into a two-ply web having exposed glue on the outer surface of one face thereof.

Another object of the invention is to provide a novel apparatus for cutting and conveying a two-ply web and stacking the individual sheets cut from the web, the apparatus including a sheeter which will automatically cut a traveling web into sheets of the desired length, and means for feeding the individual sheets to a conveyor at a rapid rate so that the sheets are carried by the conveyor in spaced relation, and means for removing the sheets from the conveyor and pressure applying the sheets to other sheets of a stack.

A further object of the invention is to provide a novel apparatus for forming honeycomb blocks from a continuous two-ply web, the apparatus including two platforms which are lowerable independently and which have a conveyor extending thereabove, there being provided means for cutting the web into individual sheets and for supplying the individual sheets to the conveyor for movement across the tops of the platforms, and there being provided means for selectively releasing the individual sheets in alignment with one of the platforms so that a stack of the sheets may be selectively formed on either one of the platforms, one of the platforms being first used for the formation of a honeycomb block, after which a stack is formed on the other of the platforms while the first formed honeycomb block is being removed from its associated platform, whereby the honeycomb block forming operation may be continuous.

Another object of the invention is to provide an apparatus for applying pitch to a honeycomb web, the apparatus including suitable feed means which will simultaneously feed a honeycomb web and expand such web to the desired dimensions, the web being formed by adhering together in end-to-end relation a plurality of honeycomb slices, the apparatus also including a pitch tank through which the honeycomb web is passed to assure the impregnation of the material of the honeycomb web with pitch to both reinforce the honeycomb web and to waterproof the same, and an apparatus for effecting the drying of the pitch so that the honeycomb web may be handled shortly subsequent to the pitch impregnating operation.

Still another object of the invention is to provide a novel method of forming a pitch impregnated honeycomb web comprising the steps of providing two continuous webs and applying node lines of glue or adhesive to opposite surfaces of one of the webs, moving the webs together to form a two-ply web having node lines of glue exposed on one face thereof, cutting the web into a plurality of identical sheets, stacking the individual sheets with the last placed sheets being adhered to other sheets of the stack by the exposed glue to form a honeycomb block, slicing the honeycomb block into a plurality of individual slices, which slices are joined together in end-to-end relation to form a honeycomb web, expanding the honeycomb web to the desired size, passing the honeycomb web through a tank of pitch to impregnate the honeycomb web material with the pitch, and then drying the pitch to provide a pitch impregnated honeycomb web.

A further object of the invention is to provide a novel pallet which includes a load supporting panel, which may be of a honeycomb construction, and spaced ground engageable feet, the individual feet being formed of the pitch impregnated honeycomb which is cut into blocks and which is applied to the underside of the load supporting panel of the pallet.

A still further object of the invention is to provide a novel apparatus for cutting a continuous honeycomb web into individual blocks and applying the blocks in a predetermined arrangement on a load supporting panel of a pallet to function as feet of the pallet, the apparatus including a knife assembly for automatically cutting a progressing honeycomb web into a plurality of identical blocks, conveyor means for feeding the individual blocks in alignment and simultaneously applying an adhesive coating to one surface thereof, and means for picking up individual ones of the blocks, spacing the blocks and positioning the blocks on a pallet load supporting panel.

Still another obpect of the invention is to provide a novel pickup head construction for engaging and picking up an individual honeycomb block which is provided with exposed cells, the pickup head including an expansible finger which is adapted to be received in a honeycomb cell and expanded while positioned within the honeycomb cell, and a coil spring around the finger adapted to bear against the upper surface of the honeycomb block and to eject the honeycomb block when the finger is contracted.

A still further object of the invention is to provide an apparatus for positioning feet on a moving panel, the apparatus including a plurality of pickup heads intended to pick up three or more blocks which function as feet, means supporting the pickup heads for movement apart to space the feet transversely of the moving panel, and means for lowering and applying the individual feet to the panel during the movement of the panel.

With the above, and other objects in view that will hereinafter appear, the nature of the invention will be more clearly understood by reference to the following detailed description, the appended claims, and the several views illustrated in the accompanying drawings:

In the embodiment of the invention illustrated in the drawings, two continuous webs 15 and 16 which are disposed in roll form and mounted on suitable spindles 17 and 18, respectively, are provided. In accordance with the invention, node lines of adhesive or glue will be applied to opposite faces of the web 15 and the web 16 will remain plain. However, if desired, node lines of adhesive could be applied to both of the webs 15 and 16.

Although the two webs 15 and 16 are initially spaced apart, they are brought together to form a single double layer web 19. This is accomplished by providing three rolls 20, 21 and 22 which are disposed in internested relation and between which the webs 15 and 16 pass. The web 16 passes over the roll 20, under the roll 21 and over the roll 22. The web 15 passes under the roll 21 and over the roll 22. Prior to passing over the roll 21, the web 15 passes over a roll 23 which is spaced from and disposed generally vertically above the roll 21.

Figure 11:
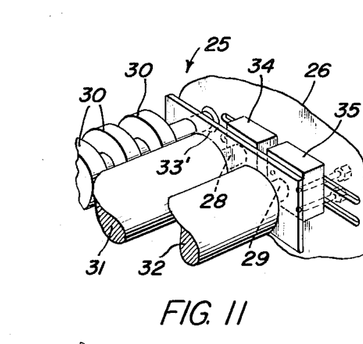
FIGURE 11 is an enlarged fragmentary perspective view showing the details of one of the glue applicators.

In passing between the rolls 23 and 21, node lines of glue are applied to opposite surfaces of the web 15. This is accomplished through the use of two glue applicators 24 and 25. The glue applicators 24 and 25 being identical, except for being staggered to apply node lines of glue which are alternated on opposite surfaces of the web 15, only the glue applicator 25 will be described in detail hereinafter. The glue applicator 25 includes a pair of spaced mounting plates 26 between which three parallel shafts 27, 28 and 29 extend. The shaft 27 may be directly rotatably journaled in the plates 26 and is provided with a plurality of spaced disks 30, as is best illustrated in FIGURE 11. The disks 30 are spaced apart according to the spacing of the node lines of glue, and are of a width equal to the desired width of the glue node lines.

The shafts 28 and 29 carry continuous rollers 31 and 32 which function as parts of a container for the glue 33 to be applied to the web 15. A plate 33' is disposed across each end of the rolls 31 and 32 to form the other boundaries of the container for the glue.

As is best illustrated in FIGURE 11, the ends of the shafts 28 and 29 are mounted in bearing blocks 34 and 35, respectively, which are adjustably carried by the support plates 26. A simple slot and fastener connection between each of the bearing blocks 34, 35 and the support plates 26 is illustrated. However, types of adjustments may be provided. By varying the spacing between the rolls 31 and 32, the thickness of the layer of adhesive or glue applied to the web 15 may be controlled. It is to be understood that the thickness of the glue carried by the individual roller 31 will be controlled by its spacing from the roller 32 and by its spacing from the disk 30, the adhesive being transferred from the roller 31 to the disk 30 for application to the web 15. The disks 30 and the rolls 31 and 32 are driven by suitable drive means 36 at the same peripheral rate as the movement of the web 15.

It is to be understood that as the webs 15 and 16 are brought together between the rolls 20, 21 and 22, the adhesive on the then underside of the web 15 will bond the web 15 to the web 16 to form the double ply web 19. Since the upper surface of the web 15 is provided with node lines of adhesive or glue, the roll 21 will be grooved to prevent the wiping of the node lines.

At least the roll 22 is driven by means of suitable drive means 37, and the web 19 is fed to a sheeter mechanism, generally referred to by the numeral 38. The sheeter mechanism 38 may be of any conventional type, and is illustrated as including a fixed knife 39 disposed beneath the web 19 and a movable knife 40 which is suitably mounted above the web 19 for movement towards and in cooperation with the fixed knife 39 to cut the web 19 into individual sheets. The movable knife 40 will, of course, be resiliently mounted and normally urged to a retracted position. A drive wheel 41 is associated with the movable knife 40 and has a plurality of lugs 42 projecting from the periphery thereof at spaced intervals for the purpose of striking the rear portion of the movable knife 40 and moving it forward into cutting cooperation with the fixed knife 39. Suitable drive means 43 are provided for driving the drive wheel 41 in timed relation to the movement of the web 19. In this manner, sheets 44 of the desired identical length will be cut upon each operation of the movable knife 40.

An endless conveyor, generally referred to by the numeral 45, is associated with the sheeter mechanism 38. The endless conveyor 45 includes a driven roll 46 and an idler roll 47. An endless belt 48 is entrained over the rolls 46 and 47 and underlies the portion of the web 19 projecting beyond the sheeter mechanism 38. The driven roll 46 is driven by a drive mechanism 49 which may have a common power source with the drive means 37. However, it is to be understood that the linear speed of the conveyor belt 48 will be in excess of the linear speed of the web 19, with the result that the web 19 is constantly urged away from the sheeter mechanism 38.

A rapid sheet feed mechanism, generally referred to by the reference numeral 50, is associated with the endless conveyor 45 adjacent the idler roll 47. The sheet feed mechanism 50 includes a segmental feed member 51 which is mounted on a shaft 52. The shaft 52 is driven from a power source 53 through a drive belt 54. The rotation of the feed member 51 is timed with the cutting of the individual sheets 44, and the peripheral speed of the feed member 51 is such that the individual sheets 44 are rapidly fed away from the sheeter mechanism 38. In this manner, there is a spacing between the individual sheets 44.

The sheet feed mechanism 50 feeds the individual sheets 44 onto a conveyor assembly, generally referred to by the numeral 55. The conveyor assembly 55 is carried by a suitable supporting frame 56 which, in turn, supports a pair of remotely disposed shafts 57 and 58. The shafts 57 and 58 are provided with aligned sprockets 59 which are disposed on the ends of the shafts 57 and 58. The sprockets 59 are interconnected by endless chains 60. The endless chains 60 are, in turn, interconnected by transversely extending bars 61. The purpose of these bars will be described in detail hereinafter.

The supporting frame 56 also supports a pair of transversely disposed shafts 62 and 63. The shafts 62 and 63 carry cams 64 and 65, respectively. The purpose of the cams 64, 65 will be described in detail hereinafter.

An electric motor 66 is suitably mounted on the frame 56 and is provided with a drive sprocket 67 which is aligned with a sprocket 68 carried by the shaft 58. A drive chain 69 is entrained over and connects together the sprockets 67 and 68. The shaft 57, of course, is driven from the shaft 58 through the sprockets 59 and the conveyor chains 60. The shaft 63 is driven from the shaft 58 by a sprocket 70 mounted on the shaft 58, a sprocket 71 mounted on the shaft 63, and a drive chain 72 entrained over the sprockets 70 and 71. The shaft 62 is similarly driven from the shaft 57 by a sprocket 73 mounted on the shaft 57, a sprocket 74 mounted on the shaft 62, and a drive chain 75 which is entrained over the sprockets 73 and 74.

Figures 2, 3:
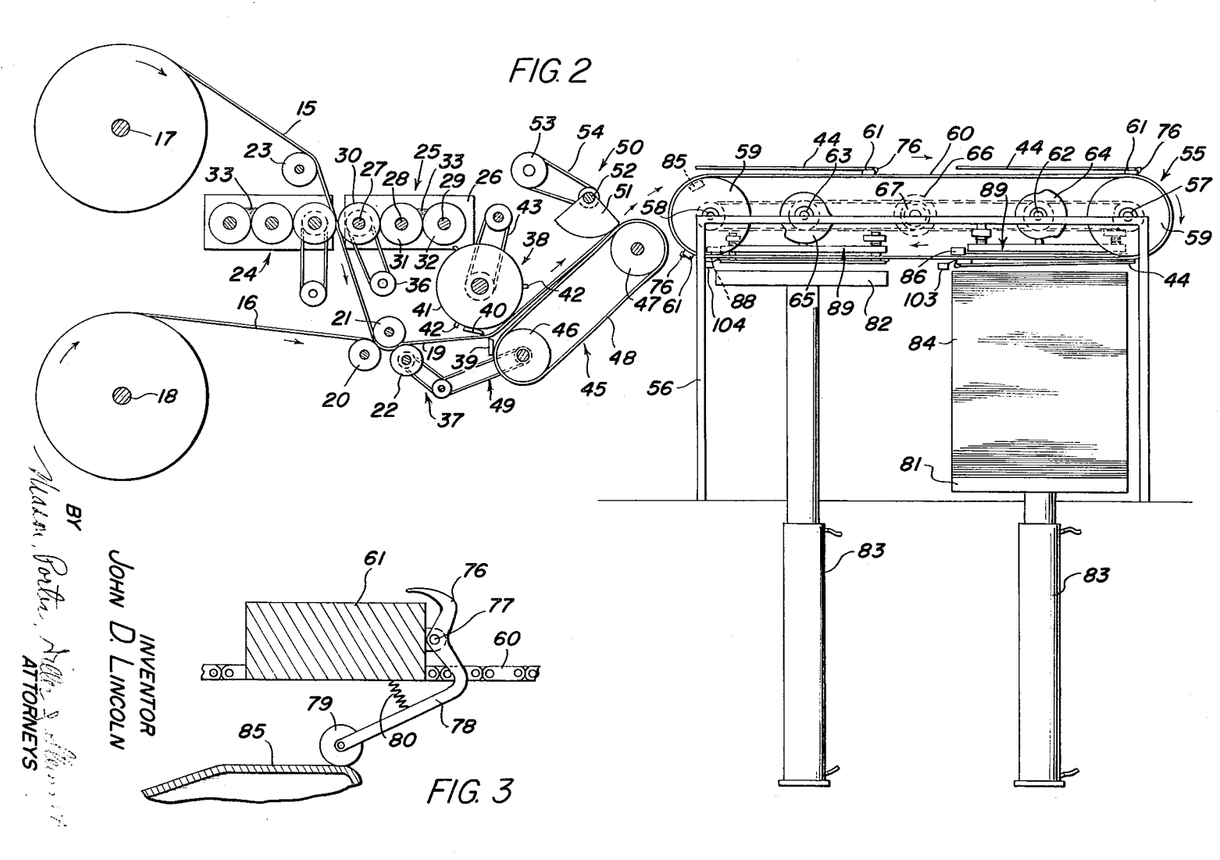
FIGURE 2 is an enlarged schematic view showing the apparatus for forming honeycomb blocks from continuous webs.
FIGURE 3 is an enlarged fragmentary sectional view showing the specific details of a clamp mechanism carried by a conveyor for stacking individual sheets for the purpose of supporting the individual sheets while associated with the conveyor.
Figure 8:
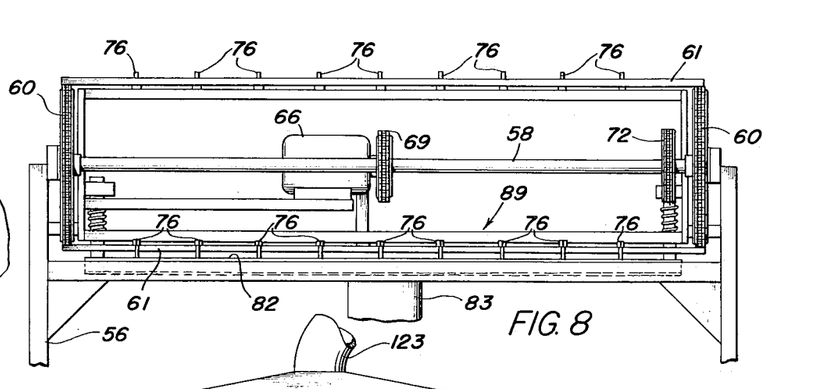
FIGURE 8 is an enlarged fragmentary end view of the sheet stacking mechanism, and shows the details of the conveyor for transporting the individual sheets and stacking the same.

As is best illustrated in FIGURES 3 and 8, each of the bars 61 is provided with a plurality of sheet gripping fingers 76 which are spaced along the bars 61. Each sheet gripping finger 76 is supported by a pivot pin 77 and has a depending extension 78 which carries a follower wheel 79. Each individual sheet gripping finger 76 is normally urged towards the block 61 by a spring 80 which is disposed intermediate the underside of the block 61 and the extension 78. Suitable cams, to be described in detail hereinafter, are provided for engagement by the follower wheel 79 to move the sheet gripping fingers 76 away from the block 61.

The supporting frame 56 is aligned with a pair of platforms 81 and 82. The platforms 81 and 82 are disposed in side-by-side relation and are spaced longitudinally of the conveyor assembly 55. Thus, the individual sheets 44 pass first over one platform and then over the other. The platforms 81 and 82 are supported by vertically disposed hydraulic cylinders 83. For convenience of operation, the cylinders 83 will normally be disposed primarily below the floor level of the space in which the platforms 81 and 82 are mounted.

Figure 12:
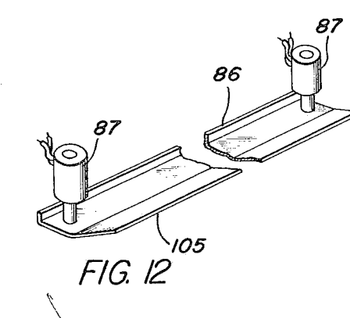
FIGURE 12 is an enlarged perspective view, with portions omitted, showing the details of a movable cam.

In accordance with the invention, it is proposed to stack the individual sheets 44 onto the platform 81 with a honeycomb block 84 being formed. After the honeycomb block 84 has been completely formed on the platform 81, the sheets 44 are then stacked on the platform 82 to form a second honeycomb block 84 while the first formed honeycomb block 84 on the platform 81 is being removed. In order to accomplish this operation, it is necessary that sheets 44 be first engaged by the sheet gripping fingers 76 and held in place with respect to one of the bars 61. Thus, a first cam 85 is disposed above and to the left of the shaft 58, as viewed in FIGURE 2, to move the sheet gripping fingers 76 away from the associated bar 61 and thus permit the sheet feed mechanism 50 to position an edge of a sheet 44 between one of the bars and its gripping fingers. A sheet 44 so gripped is conveyed along the upper run of the conveyor assembly 55 and down along the lower run, with the sheet 44 first passing over the platform 81. A second cam 86 is positioned generally in alignment with the left edge of the platform 81. Unlike the cam 85, the second cam 86 is mounted for vertical movement and is supported by suitable electromagnetic members 87, as is best illustrated in FIGURE 12. When the sheets 44 are to be deposited onto the platform 82, it is necessary that the cam 86 be disposed in an inoperative position. The sheets 44 passing over the platform 81 will then be released onto the platform 82 through a fixed cam 88 disposed generally in alignment with the left edge of the platform 82.

At this time, it is pointed out that the sheet 44 is provided with node lines of adhesive or glue on the underside thereof as it passes over the platforms 81 and 82. It is desired that the individual sheet 44 be retained above the platform 81 and the previously deposited sheets 44 thereon until the sheet to be deposited on the stack carried by the platform is in alignment with the previously deposited sheets. In order to accomplish this, in addition to the individual cams 86 and 88, there is provided a sheet positioning mechanism, generally referred to by the numeral 89, and best illustrated in FIGURE 10. A sheet positioning mechanism 89 overlies each of the platforms 81 and 82, and includes a housing 90 which is hollow and which includes a top wall 91, a bottom wall 92, and a peripheral frame 93. A suitable vacuum line 94 is connected to the housing 90 so that a vacuum is formed in the interior thereof. The bottom wall 92 is provided with a plurality of perforations 95 which may be disposed in any desired pattern.

Figures 5, 6, 9, 10:
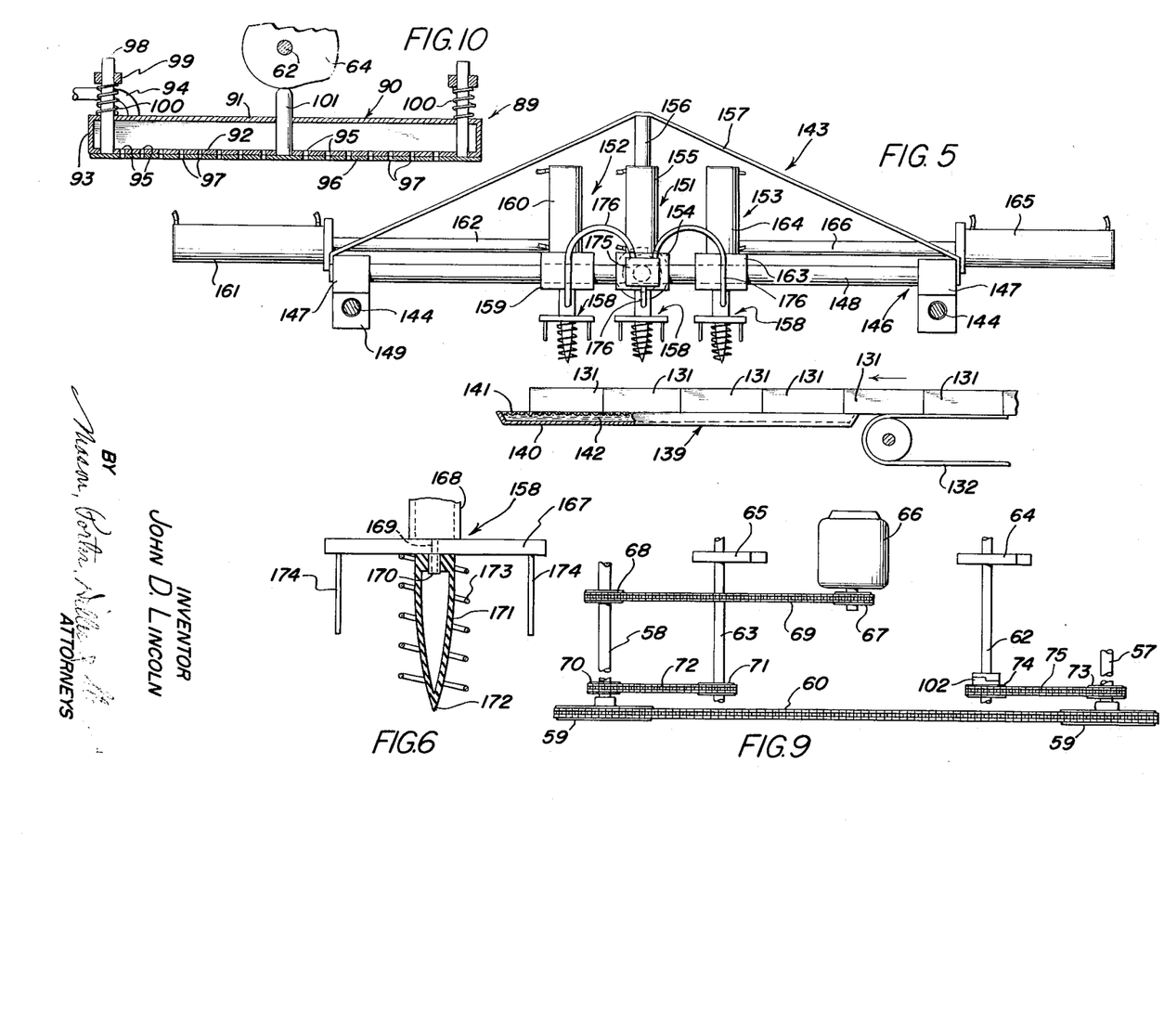
FIGURE 5 is an enlarged fragmentary transverse sectional view showing the details of the apparatus for picking up and positioning three individual blocks of honeycomb web.
FIGURE 6 is an enlarged fragmentary elevational view of one of the pickup heads for picking up and positioning a block formed from a honeycomb web, the pickup finger of the pickup head being shown in section.
FIGURE 9 is a schematic plan view showing the drive for the various components of the conveyor and the sheet stacking mechanism.
FIGURE 10 is an enlarged fragmentary vertical sectional view taken through a device for temporarily supporting and positioning a sheet prior to its application to a stack of sheets in the formation of the honeycomb block.

A sheet engaging plate 96 underlies the bottom wall 92 and is provided with a plurality of perforations 97 which are aligned with the perforations 95. The sheet engaging plate 96 is supported for vertical movement only by a plurality of rods 98 which are disposed at least at the corners of the plate 96. The rods 98 pass through the housing 90 and are guided for vertical movement only thereby. The rods 98 are provided with collars 99 adjacent their upper ends and coil springs 100 are entrained about the rods 98 and bear against the top wall 91 and the collars 99 to constantly urge the plate 96 towards a position in face-to-face engagement with the undersurface of the bottom wall 92.

A centrally disposed pin 101 is secured to the center of the plate 96 and extends up through the housing 90. The pin 101 is aligned with one of the cams 64 and 65 and is engaged thereby to force the plate 96 to a lowered position.

In the operation of the sheet positioning mechanism 89, a sheet 44 is pulled beneath the plate 96 and is immediately urged up into engagement with the underside of the plate 96 by the vacuum being drawn within the housing 90. Assuming that the sheet is to be placed on the stack carried by the platform 81, when the sheet 44 is aligned with the stack of sheets on the platform 81, it will be released from the conveyor assembly 55. At the same time, the cam 64, which is driven in timed relation through the operation of the conveyor assembly 55, will force the pin 101 downwardly, thus forcing the plate 96 and the sheet 44 disposed beneath the plate 96 downwardly. The plate 96 will pressure apply the sheet 44 to the stack carried by the platform 81.

The operation of the sheet positioning mechanism 89 associated with the platform 82 will function in the manner described above. However, while the cam 65 may continuously rotate since the movement of the plate 96 of the sheet positioning mechanism associated with the platform 82 will have no effect if a sheet 44 is not aligned therewith, with respect to the sheet positioning mechanism 89 aligned with the platform 81, it may be desirable that the cam 64 does not operate when the sheets 44 are not being positioned on the platform 81. This may be accomplished by a suitable electrically controlled clutch which is diagrammatically illustrated in FIGURE 9 as being positioned between the sprocket 74 and the shaft 62. The clutch, which is referred to by the numeral 102, will be preferably of the type having a pin and socket drive so that when the clutch 102 is engaged, the cam 64 will be driven in its usual timed relation with respect to the conveyor assembly 55.

As is pointed out above, it is desired that the cam 86 be effective only when the sheets 44 are being deposited in a stack on the platform 81. In order that this may be automatically accomplished, a first switch 103 is positioned for engagement by the stack of sheets on the platform 81 when the stack reaches the desired height to produce the desired honeycomb block 84. A second switch 104 is associated with the platform 82. The switches 103 and 104 may be connected in any conventional way to the electromagnetic members 87 so that when the switch 103 is tripped, the electromagnetic members will elevate the cam 86 to an inoperative position, and when the switch 104 is tripped, the electromagnetic members 87 will permit the cam 85 to return to its normal operative position.

With further reference to FIGURE 12, it will be seen that a typical cam is illustrated. The cam 86 illustrated in this figure has a ramp 105 which permits the follower wheel 79 to ride up onto the cam and thus move the sheet gripping fingers 76 to release positions. The cams 85 and 88 will be similarly configurated.

The controls for the fluid cylinders 83 are manual, and, accordingly, are not illustrated. The cylinders 83 will be of the double acting type and will be manually returned to their elevated positions. When in their elevated positions, the fluid in the individual cylinder 83 will be permitted to slowly leak from the cylinders 83 and thus permit the lowering of the platforms 81 and 82 at a constant rate, which rate will be equal to the rate the honeycomb block 84 is being built up onto the platforms 81, 82 by the positioning of the sheets 44. It is to be understood that this rate will be constant and therefore the cylinders 83 may be permitted to operate at a constant continuous rate.

After the individual honeycomb blocks 84 are formed, they are removed from the respective platforms 81, 82, by means of a fork lift truck or other type of hoist means. The individual honeycomb block 84 is then transferred to a honeycomb block slicing machine, generally referred to by the numeral 106, and generally illustrated in FIGURE 1. The honeycomb slicing machine is not a part of the invention with the exception of its use for slicing the honeycomb block 84 into a plurality of individual slices 107.

Figure 1:
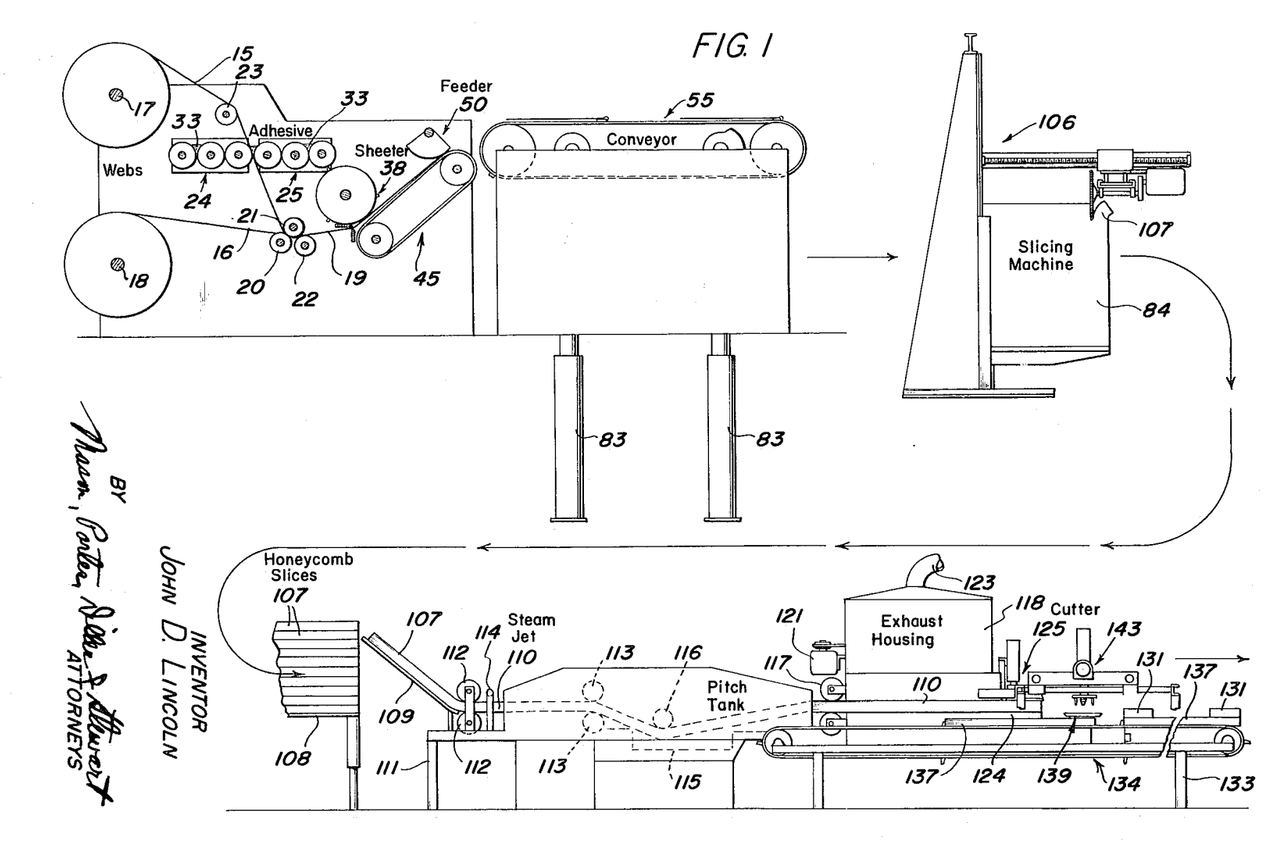
FIGURE 1 is a schematic view showing the entire apparatus for forming a pitch impregnated honeycomb web, cutting the web into individual blocks and positioning the blocks on a pallet supporting panel.

As is schematically illustrated in FIGURE 1, the honeycomb slices 107 are stacked on a suitable platform 108 after being sliced by the slicing machine 106. A chute 109 is disposed adjacent the platform 108 and the individual honeycomb slices 107 are slid down the chute 109. As the unexpanded honeycomb slices are fed into the chute 109, a resin is applied to one edge and a catalyst is applied to the other edge, so that the honeycomb slices will adhere on contact to make a continuous honeycomb web 110.

The chute 109 is supported by a suitable platform structure 111 which also supports a pair of opposed feed rolls 112. A second pair of feed rolls 113 are spaced from the feed rolls 112 and are supported by the platform 111. The feed rolls 113 travel at a greater peripheral rate than the feed rolls 112 so that the honeycomb web 110 is expanded the required amount.

A steam jet assembly 114 is carried by the platform 111 immediately to the right of the feed rolls 112. The steam jet assembly directs live steam onto the honeycomb web 110 and functions to soften the material of the honeycomb web.

A tank 115 for pitch is disposed to the right of the feed rolls 113. A roll 116 is disposed above the tank 115 and forces the honeycomb web 110 to pass through the pitch disposed in the tank 115, at which time the material of the honeycomb web 110 is impregnated with the pitch.

The pitch to be used in impregnating the honeycomb web 110 is a coal tar pitch having a melting point of 260 degrees F. and a zero penetration point of over 120 degrees F. The zero penetration point of a pitch is the point where pitch ceases to be brittle and acts as a thermoplastic. Below this point, pitch will not be subject to cold flow under load.

After the honeycomb web 110 is impregnated with pitch, it passes up out of the tank 115 and between a pair of guide rolls 117 which are disposed in opposed relation. The honeycomb web 110 then passes beneath a housing 118 in which an exhaust fan 119 is supported by a shaft 120. The exhaust fan 119 is horizontally disposed and the shaft 120 is vertically disposed. An electric motor 121 is mounted exteriorly of the housing 118 and is connected to the drive shaft 120 by a drive belt 122. The housing 118 is provided with an exhaust duct 123. The exhaust fan 119 functions to aid in the setting of the pitch.

Figure 4:
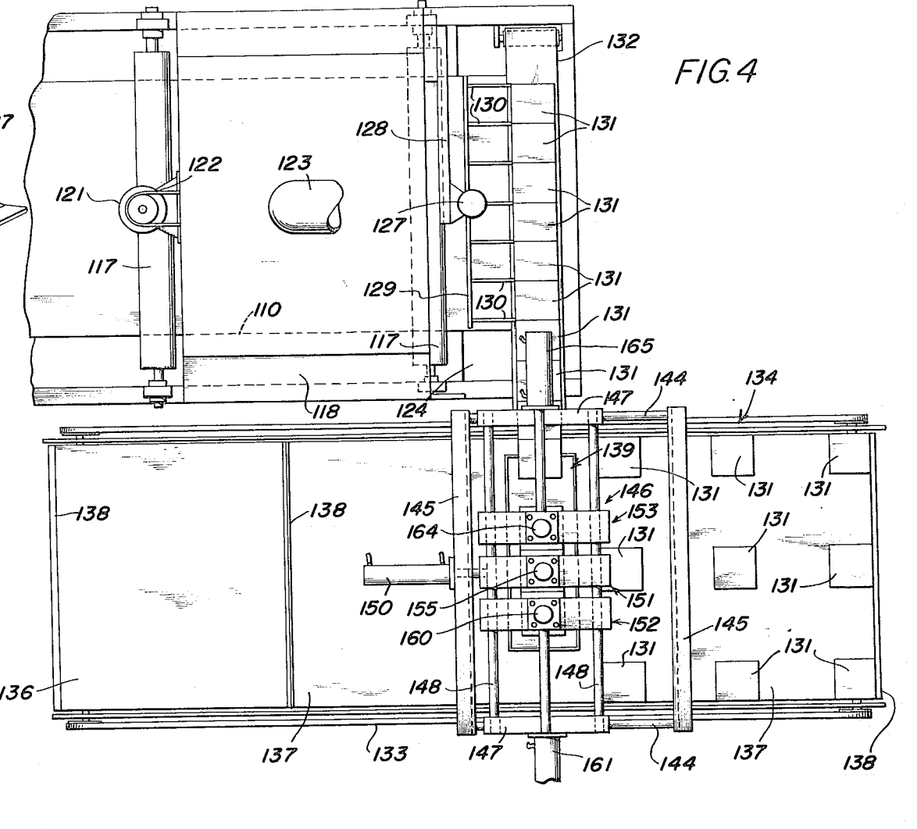
FIGURE 4 is an enlarged plan view of the apparatus showing the components thereof for forming the honeycomb web into individual blocks and applying the blocks as feet to pallet load supporting panels.

After the honeycomb web 110 passes beneath the housing 118, it passes over a platen 124. A vertically reciprocating cutter assembly, generally referred to by the numeral 125, is disposed above the platen. The cutter assembly includes a knife assembly, generally referred to by the numeral 126, and a vertically reciprocating support in the form of a quick acting fluid cylinder 127. The fluid cylinder 127, as is best illustrated in FIGURE 4, is supported by a support arm 128 carried by the platform 111. Also, as is best illustrated in FIGURE 4, the knife assembly 126 includes a transverse blade 129 and a plurality of longitudinal blades 130. It is to be noted that the longitudinal blades 130 extend to the right from the transverse blade 129. The blades 129 and 130 are so arranged that they will cut from the progressing honeycomb web 110 six blocks which are illustrated as being square in plan, but which may be of other regular rectangular shapes. It is to be noted that the spacing of the blades 130 is such that there will be trim normally formed at the edges of the honeycomb web 110. Such trim will be disposed of in a suitable manner, such as, for example, by means of guides (not shown) and only the individual blocks, referred to by the reference numeral 131, will be used in the process of this invention.

Immediately to the right of the cutter assembly 125, as viewed in FIGURE 4, is a transverse conveyor 132 supported by the platform 111. The transverse conveyor 132 receives the blocks 131 from the platen and proceeds to move the blocks 131 from positions overlying the platform 111.

Another platform or frame structure 133 is disposed alongside the platform 111 in the area of the cutter assembly 125, the platform 133 being disposed to the right of the platform 111, as viewed in the direction of travel of the honeycomb web 110.

The platform 133 supports an endless conveyor, generally referred to by the numeral 134. The endless conveyor 134 extends in the same direction as the direction of movement of the honeycomb web 110 and is disposed parallel thereto. The endless conveyor 134 includes a pair of rolls 135, supported by the platform 133. The rolls 135, in turn, support an endless belt 136. The belt 136 supports load supporting panels 137 of pallets. The load supporting panels 137 may be of any construction, although in accordance with the invention, they would be preferably formed of honeycomb panels, that is, a pair of facing layers separated by a honeycomb web. The belt 136 is provided with spaced, transversely extending lugs 138 which are spaced apart a distance equal to the length of one of the panels 137 plus the spacing between a pair of the blocks 131 when applied to the panel 137 for a reason to be described in detail hereinafter.

Reference is now had to FIGURE 5, wherein the details of an adhesive or glue applicator for the blocks 131 are illustrated. The adhesive applicator is generally referred to by the numeral 139, and is in the form of a pan 140 having a block supporting screen 141 in the upper portion thereof. The adhesive or glue 142 will be maintained at a constant level within the pan 140, which level is approximately at the level of the screen 141. The individual blocks 131 are moved onto the screen 141 by the conveyor 132, the pan 140 being in alignment with the conveyor 132 and overlying the path of movement of the panels 137.

Figure 7:
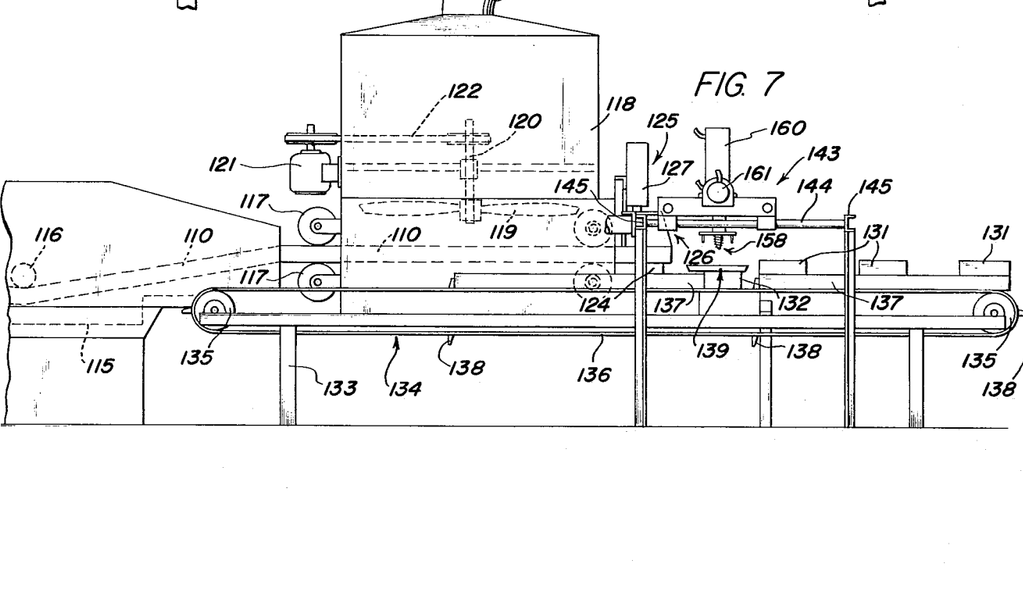
FIGURE 7 is an enlarged elevational view of the apparatus for applying individual blocks of honeycomb web to load supporting panels of pallets.

A block positioning mechanism, generally referred to by the numeral 143, overlies the conveyor 134 in the vicinity of the adhesive applicator 139. The block positioning mechanism includes a pair of longitudinally extending rails 144 which are disposed above the conveyor 134 and are supported at their ends by transverse frame members 145 which are, in turn, supported from the platform 133 in the manner best illustrated in FIGURE 7. A carriage, generally referred to by the numeral 146, is supported on the rails 144 for longitudinal movement. The carriage 146 includes a pair of side frame members 147 which are connected together by transverse rods 148, the rods 148 being disposed in parallel relation. The side frame members 147 have depending portions 149 adjacent their ends, the portions 149 being slidably mounted on the rails 144.

As is best illustrated in FIGURE 4, a horizontally disposed, longitudinally extending extensible fluid motor 150 is carried by the left hand one of the supports 145 and is connected to the carriage 146. The fluid motor 150 is of the double acting type and is operable to reciprocate the carriage 146.

The carriage 146 carries three block positioning units. The block positioning units include a centrally located block positioning unit, generally referred to by the numeral 151, and a pair of outer block positioning units, generally referred to by the numerals 152 and 153. The block positioning units, 151, 152, 153 are mounted on the rods 148. However, the block positioning unit 151 is fixed against shifting.

The block positioning unit 151 includes a base 154 through which the rods 148 pass. An extensible fluid motor 155 is vertically mounted on the base 154 and projects therethrough. It is to be noted that the fluid motor 155 is of the double acting type and is positioned centrally of the base 154 intermediate the rods 148. The upper end of the fluid motor 155 is provided with an extension 156 to which a strap type brace 157 is connected. The ends of the brace 157 are connected to the side frame members 147, the brace 157 both positioning the central block positioning unit 151 and reinforcing the carriage 146. A pickup head, generally referred to by the numeral 158, is carried by the lower end of the fluid motor 155. The details of the pickup head 158 will be described hereinafter.

The block positioning unit 152 includes a base 159 which is slidably mounted on the rods 148. A centrally located fluid motor 160 is carried by the base 159 and extends down through the base 159 between the rods 148. A pickup head 158 is secured to the lower end of the fluid motor 160, which fluid motor is also of the double acting type.

It is intended that the block positioning unit 152 be moved away from the central block positioning unit 151 so as to space the blocks 131 carried thereby. This is accomplished by slidably mounting the base 159 on the rods 148 and providing a horizontally disposed fluid motor 161 which is supported by one of the side frame members 147 and which has a piston rod 162 suitably connected to the base 159. The fluid motor 161 will be of the double acting type so that it may return the block positioning unit 152 to its original position.

The block positioning unit 153 includes a base 163 which is slidable on the rods 148 and which carries a centrally located, upstanding fluid motor 164 which is of the double acting type. The lower end of the fluid motor 164 supports a pickup head 158. A horizontally disposed fluid motor 165 of the double acting type is carried by the side frame member 147 adjacent the block positioning unit 153. The fluid motor 165 has a piston rod 166 which is connected to the base 163 so that the fluid motor 165 may be effective in moving the block positioning unit 153 to the right and return, as viewed in FIGURE 5.

Reference is now had to FIGURE 6, wherein the details of one of the pickup heads 158 are illustrated. The pickup head 158 includes a mounting plate 167 which is secured to the lower end of a piston rod of an associated one of the fluid motors 155, 160, 164. For purposes of identification, the piston rod will be referred to by the numeral 168. The lower portion of the piston rod 168 is tubular, and the mounting plate 167 has a bore 169 therethrough in communication with the piston rod 168. A tubular fitting 170 extends down from the underside of the mounting plate 167 and an expansible finger 171 is carried by the fitting 170. The expansible finger 171 is formed of a rubber-like material and is tubular. It is of an inverted conical outline, and terminates in a pointed lower end portion 172.

A coil spring 173 loosely encircles the finger 171 and has the upper end thereof secured to the mounting plate 167. Also, a pair of fixed fingers 174 extend down from the mounting plate 167 adjacent the outer edges thereof.

It is to be understood that the individual block 131, having been formed from a section of a honeycomb web, is provided with a plurality of vertically extending cells. In the operation of the pickup head 158, the finger 171 enters into a centrally located one of the cells of the block 131 and the fingers 174 engage in others of the cells. In this manner, twisting and tilting of the block 131 is prevented. In timed relation to the positioning of the finger 171 within a cell of the block 131, fluid is introduced into the finger 171 under pressure so as to expand the finger 171 and force it into engagement with the walls defining the cell in which it is positioned, thereby interlocking the pickup head 158 with the individual block 131. It is pointed out that at the time the finger 171 is positioned within the block 131, the spring 173 engages the upper face of the block 131 and is compressed. Thus, when the finger 171 is contracted and the pickup head 158 is retracted, the spring 173 will serve to automatically eject the block 131 and strip it off of the finger 171.

Reference is again had to FIGURE 5, wherein it is shown that a fluid manifold 175 is secured to the base 154. Fluid lines 176 extend from the manifold 175 to the individual pickup heads 158.

As is best illustrated in FIGURE 4, it is desired that the blocks 131 be positioned on the panel 137 in spaced relation, both transversely and longitudinally of the panel. The blocks 131, when secured to the panel 137, function as feet for the panel. Four of the blocks are disposed at the corners of the panel, four are disposed at the central points of the edges of the panel, and one is disposed in the center of the panel, thus providing the necessary openings for a fork lift truck lifting assembly.

In the operation of the block positioning mechanism 143, the pickup heads 158 move downwardly and pick up three blocks 131 which are disposed in end abutting relation on adhesive applicator 139, as is illustrated in FIGURE 5. The blocks 131 are then slightly elevated, after which the fluid motors 161 and 165 are actuated to move the outer blocks 131 outwardly away from the central block 131 which remains stationary transversely of the panel 137. As the outer blocks 131 are being moved outwardly, the carriage 146 is being moved to the right in FIGURE 4, and the blocks 131 are all being lowered so that once the blocks have reached their transverse positions, they may be moved into engagement with the surface of the panel 137. The carriage 146 will move at the same rate as the panel 137 so that there is no relative movement between the blocks 131 and the panel 137 when the blocks are being applied.

The operation of the block positioning mechanism 143 is automatic so that as soon as the carriage 146 returns to its initial position, it is again actuated to pick up another set of blocks 131 and to move them into position on the panel 137. As mentioned above, the lugs 138 of the conveyor belt 136 are spaced apart a distance equal to the length of one of the panels 137 plus the spacing between a pair of the blocks 131. By so positioning the lugs 138, the edges of adjacent panels 137 are spaced apart a distance equal to the spacing between the blocks 131. Accordingly, the block positioning mechanism 143 may continuously operate notwithstanding the fact that the blocks 131 are being positioned on individual panels 137. The panels 137 may be fed to the conveyor 134 either automatically or manually, as it is deemed best suitable.

The use of the blocks 131 as feet for pallets is a very desirable use. The honeycomb blocks have a very high compression strength along the axis of the cells, and the pitch serves to both reinforce the material of the honeycomb blocks 131 and to weatherproof the blocks. It is known that pallets are customarily exposed to the weather and it has been found that honeycomb blocks treated with pitch in the manner described will withstand the elements. Although the panel 137 may be formed of any material, including a honeycomb panel, if a honeycomb panel is utilized in the construction of the pallet, it may also be formed of pitch impregnated material.

It is to be understood that the references herein made to the cutting of individual sheets have to do with the cutting of units of length from the composite or two-ply web 19 after it has been formed by a bringing together of the webs 16 and 16 and the adhering thereof together between the rolls 20–21 by the adhesive applied by the glue applicator 24. Each such unit, as formed by action of the movable knife 40, will comprise two superposed sheets adhered one to the other by longitudinally extending, parallel spaced node lines of adhesive, the bottom surface thereof will be devoid of adhesive and the top surface thereof will have longitudinally extending, parallel spaced node lines of adhesive thereon bearing staggered relation to those between the sheets, as applied by the disks 30.

From the foregoing, it will be seen that novel and advantageous provision has been made for carrying out the desired end. However, attention is again directed to the fact that variations may be made in the example method and apparatus disclosed herein without departing from the spirit and scope of the invention, as defined in the appended claims.

I claim:

1. A method of treating a honeycomb panel comprising the steps of expanding a honeycomb slice and while expanding the honeycomb slice softening the fibers thereof through the application of steam, passing the expanded honeycomb through a pitch bath, and then cooling the pitch whereby the same sets.

2. A method of forming and applying feet to a pallet panel in a row and in spaced relation comprising the step of cutting a honeycomb panel into individual pallet feet, applying adhesive to undersides of said pallet feet, simultaneous picking up and separating a plurality of said pallet feet, and then forcibly placing said pallet feet on an inverted pallet panel.

3. A method of forming and applying treated honeycomb feet to a pallet panel in a row and in spaced relation, said method comprising the steps of expanding a honeycomb slice and while expanding the honeycomb slice softening the fibers thereof through the application of steam, passing the expanded honeycomb through a pitch bath cooling the pitch whereby the same sets, cutting said honeycomb panel into individual pallet feet, applying adhesive to undersides of said pallet feet, simultaneous picking up and separating a plurality of said pallet feet, and then forcibly placing said pallet feet on an inverted pallet panel.

4. A method of forming a treated honeycomb panel comprising the steps of simultaneously feeding two continuous webs, applying node lines of adhesive to at least one of said webs, securing said webs together to form a multiple ply web, cutting said multiple ply web into individual sheets, stacking and bonding together said sheets to form a honeycomb block, slicing said honeycomb block into slices, joining ends of said honeycomb slices into a continuous honeycomb panel, expanding said honeycomb panel, passing said honeycomb panel through a pitch bath, and then cooling the pitch whereby the same sets.

5. A method of forming and applying treated feet to a pallet panel comprising the steps of simultaneously feeding two continuous webs, applying node lines of adhesive to at least one of said webs, securing said webs together to form a multiple ply web, cutting said multiple ply web into individual sheets, stacking and bonding together said sheets to form a honeycomb block, slicing said honeycomb block into slices, joining ends of said honeycomb slices into a continuous honeycomb panel, expanding said honeycomb panel, passing said expanded honeycomb panel through a pitch bath, cooling the pitch whereby the same sets, cutting said honeycomb panel into individual pallet feet, applying adhesive to undersides of said pallet feet, simultaneously picking up and separating a plurality of said pallet feet, and then forcibly placing said pallet feet on an inverted pallet panel.

6. A method of forming a honeycomb block comprising the steps of simultaneously feeding two continuous webs, applying node lines of adhesive to at least one of said webs, bringing together and joining said webs in face-to-face relation with node lines of adhesive exposed on one of said webs, cutting said joined webs into multiple ply sheets, and arranging said multiple ply sheets in a stack with said exposed adhesive securing the last positioned multiple ply sheet to the remainder of the stack, progressively lowering the stack as the multiple sheets are added thereto with the top of the stack remaining generally at the same level, expanding the honeycomb slices and while expanding the honeycomb slices softening the fibers thereof through the application of steam, passing the expanded honeycombs through a pitch bath, and then cooling the pitch whereby the same sets.

References Cited by the Examiner

UNITED STATES PATENTS

| | | | |
|---|---|---|---|
| 1,191,765 | 7/1916 | Crumbaugh | 154—45.9 XR |
| 1,207,734 | 12/1916 | Feeley | 161—36 |
| 1,396,021 | 11/1921 | Burningham et al. | |
| 1,473,096 | 11/1923 | Hill et al. | 156—587 |
| 2,432,849 | 12/1947 | Adams et al. | |
| 2,444,183 | 6/1948 | Cahners. | |
| 2,633,439 | 3/1953 | Konstandt | 154—45.9 |
| 2,636,540 | 4/1953 | Lincoln | 154—1.8 |
| 2,654,686 | 10/1953 | Hansen | 154—45.9 |
| 2,670,026 | 2/1954 | Ungar | 154—1.8 |
| 2,670,314 | 2/1954 | Ungar | 154—117 |
| 2,691,500 | 10/1954 | Baumann | 248—120 |
| 2,697,231 | 12/1954 | Strand | 154—45.9 XR |
| 2,702,682 | 2/1955 | Newsom | 248—120 |
| 2,731,379 | 1/1956 | Wheeler | 156—197 |
| 2,734,843 | 2/1956 | Steele | 154—122 |
| 2,860,740 | 11/1958 | Holland et al. | 156—159 XR |
| 2,887,425 | 5/1959 | Holland | 154—122 |
| 2,910,396 | 10/1959 | Randall et al. | 154—45.9 |
| 2,911,076 | 11/1959 | Saunders et al. | 154—45.9 XR |
| 3,035,952 | 5/1962 | Gwynne | 156—512 |
| 3,074,839 | 1/1963 | May et al. | 159—197 |

EARL M. BERGERT, *Primary Examiner.*

ROBERT C. RIORDON, CARL F. KRAFFT, *Examiners.*